Figure 1:
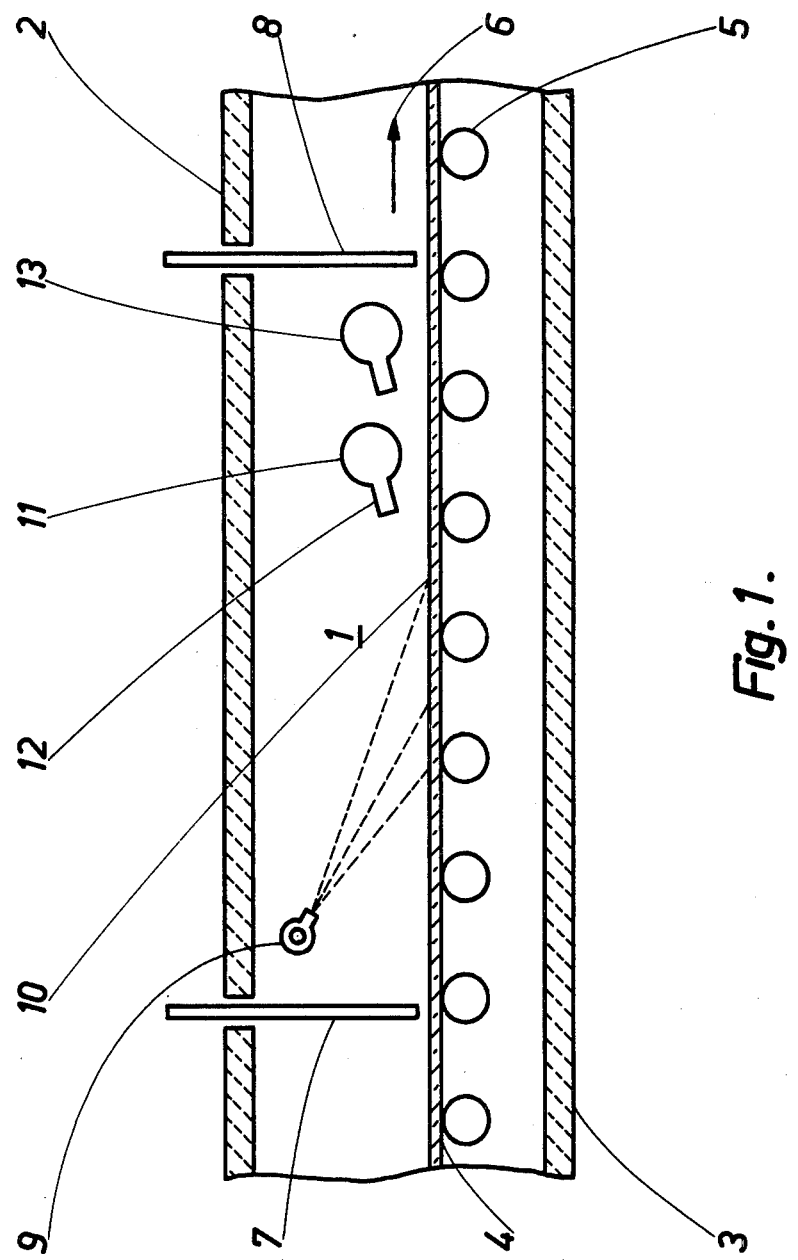

United States Patent [19]

Van Laethem

[11] 4,125,391
[45] Nov. 14, 1978

[54] PROCESS OF FORMING A METAL OR METAL COMPOUND COATING ON A FACE OF A GLASS SUBSTRATE AND APPARATUS SUITABLE FOR USE IN FORMING SUCH COATING

[75] Inventor: Robert Van Laethem, Loverval, Belgium

[73] Assignee: BFG Glassgroup, Paris, France

[21] Appl. No.: 781,959

[22] Filed: Mar. 28, 1977

[30] Foreign Application Priority Data

Apr. 13, 1976 [GB] United Kingdom ............... 15065/76

[51] Int. Cl.$^2$ ............................................. C03C 17/00
[52] U.S. Cl. ................... 65/60 D; 65/30 R; 65/60 C; 65/99 A; 65/182 R; 118/48; 118/49; 118/49.1; 118/49.5; 118/50; 118/50.1; 427/109; 427/110; 427/250; 427/251; 427/252; 427/253; 427/294; 427/314; 427/350; 427/424; 427/427
[58] Field of Search ............... 427/350, 314, 250–253, 427/424, 427, 110, 109, 294, 350; 65/30 R, 30 A, 30 B, 60 D, 60 C, 79 A, 182 R; 118/48, 326, 50, 50.1, 49.5, 49.1, 49

[56] References Cited

U.S. PATENT DOCUMENTS

| B 438,706 | 1/1975 | Kushihashi et al. | 165/60 D |
|---|---|---|---|
| 2,414,923 | 1/1947 | Borcheller | 427/424 |
| 2,724,658 | 11/1955 | Lytle | 427/424 |
| 3,473,954 | 10/1969 | Mattson | 427/251 |
| 3,672,948 | 6/1972 | Foehring et al. | 427/248 |
| 3,805,736 | 4/1974 | Foehring et al. | 118/49 |
| 4,022,601 | 5/1977 | Sopko | 427/255 |

Primary Examiner—Ronald H. Smith
Assistant Examiner—Janyce A. Bell
Attorney, Agent, or Firm—Cushman, Darby & Cushman

[57] ABSTRACT

A process of forming a metal or metal compound coating on a face of a glass substrate by contacting such face while at elevated temperature with droplets comprising a metal compound which by pyrolysis forms the coating metal or metal compound on the face, the improvement which comprises the steps of discharging at least one stream of the droplets at an inclination to the face so as to impinge on a zone within the face area to be coated, effecting a relative displacement between the stream and substrate so that the instantaneous zone of impingement of the stream on the face is progressively displaced along the face area to be coated, and creating suction forces in exhaust ducting whose entrance is located directly downstream from the impingement zone so as to cause gases environmental to the stream to flow continuously in the downstream direction away from the stream and from the vicinity of the impingement zone and directly into the ducting substantially without affecting the paths of the droplets toward the zone.

25 Claims, 1 Drawing Figure

PROCESS OF FORMING A METAL OR METAL COMPOUND COATING ON A FACE OF A GLASS SUBSTRATE AND APPARATUS SUITABLE FOR USE IN FORMING SUCH COATING

This invention relates to a process for forming a metal or metal compound coating on a face of a glass substrate by contacting such face while it is elevated temperature with droplets comprising a metal compound which by pyrolysis forms the coating metal or metal compound on the face. The invention also relates to apparatus for use in carrying out such a process.

Processes of the above kind are employed for forming coatings which modify the apparent color of the glass and/or which have some other required properties in respect of incident radiation, e.g. an infrared-reflecting property.

The known processes do not always enable coatings with satisfactory properties to be achieved. Difficulties are encountered in forming coatings which are of satisfactory quality, e.g. in respect of their structure, their optical quality or their uniformity of thickness.

The subject of the patent application is a coating process which promises to have important advantages with respect to the reliability with which good quality coatings can be formed.

The process according to the invention, which is of the kind above referred to, comprises the improved procedure of discharging at least one stream of droplets at an inclination to the face so as to impinge on a zone within the face area to be coated while the stream and substrate are relatively displaced so that the instantaneous zone of impingement of the stream on the face is progressively displaced along the face area to be coated, and creating suction forces in exhaust ducting whose entrance is located directly downstream from the impingement zone, by which suction forces gases environmental to the stream are caused continuously to flow in the downstream direction away from the stream and from the vicinity of the impingement zone and directly into the ducting substantially without affecting the paths of the droplets toward the zone.

Experiments indicate that as compared with hitherto known processes, the process according to the invention makes it easier to form a coating, e.g. a metal oxide coating of homogeneous structure featuring a regular arrangement of crystals and providing a uniform coverage of the substrate surface. This advantage is evident even for relatively thick coatings, e.g. coatings having an optical thickness corresponding to the fifth interferential order and above. The advantage referred to is apparently attributable in part to the control of the suction current in the described manner whereby gases flowing in the downstream direction in the regions of the droplet stream and the impingement zone on the substrate are maintained in movement in this downstream direction. It has been found that there is little or no tendency for decomposition products to precipitate onto the substrate or already formed coating from within the gaseous environment adjacent the substrate. In consequence the coating metal or metal compound is formed substantially only at the hot substrate surface. The inclination of the droplet stream or streams to the substrate face to be coated is also a factor contributing to the formation of uniform coatings which the process makes possible. Preferably the substrate is displaced in a given direction and each droplet stream is inclined so that it has a velocity component in the direction of the substrate displacement and so that the included angle between its axis and the face, measured in a plane which contains the axis and is parallel with the direction of displacement of the substrate, is in the range 25°–35°.

For achieving the best results all parts of each droplet stream should be incident upon the substrate at a substantial inclination to the vertical. Accordingly, in preferred embodiments of the process, each stream is a parallel stream or is one which diverges from its source at an angle of not more than 30°.

Experiments indicate that uniform coatings can be more easily formed if certain conditions are observed with respect to the distance between the substrate face being coated and the position from which each droplet stream is discharged toward such face. Preferably such position, for each said stream, is at a distance from the face, measured normally to such face, of from 15 to 35 cm. This has been found to be the most suitable range, particularly when observing the preferred inclination and divergency ranges for the droplet stream above referred to.

In certain embodiments of the process, it is applied for coating a face of continuously longitudinally moving glass ribbon and use made of a droplet stream which is displaced to and fro transversely of the ribbon path. By carrying out the invention in that way, a ribbon of glass can be coated over substantially its entire width while using a single droplet discharge head of small dimensions so that the rate of supply of the metal compound can be easily controlled. In such a process, the suction forces can be created in an exhaust duct which is displaced to and fro across the ribbon path so that the entrance of such duct remains directly downstream from the impingement zone of the droplet stream.

In alternative embodiments of the invention, applied for coating a face of a continuously longitudinally moving glass ribbon, use is made of one or more droplet streams whose impingement zone or combined impingement zones on the substrate extend across substantially the whole width of the ribbon. In that case the entire ribbon can be coated without displacing the source of the droplet stream. Moreover the area coating rate can be quite high so that the process can be easily performed for coating a relatively fast moving ribbon of glass as it travels from the ribbon forming plant.

The invention includes processes wherein a continuously longitudinally moving ribbon of glass is coated and use is made of stationary exhaust ducting having an exhaust gas inlet which extends transversely across the ribbon path. Such an exhaust ducting can be employed together with a stationary droplet discharge means extending transversely across the ribbon path as above referred to, or together with a droplet discharge means which is displaced to and fro across the path of the traveling ribbon. When using such a stationary exhaust ducting, it is preferable to have a series of exhaust inlets leading from side-by-side positions across the ribbon path. In such a case, suction forces can be created in the exhaust inlets either by a common fan or other aspirator located behind such inlets or by a series of aspirators distributed among the different inlets.

Advantageously suction forces are created in an exhaust duct which has main gas entry openings facing generally toward the impingement zone of the droplet stream on the substrate face, and peripheral openings which are located at positions behind such main openings and serve to reduce or avoid turbulence in any gas streams which flow past such main openings.

It is advantageous to suck gases into two or more exhaust ducts disposed at successive spaced positions downstream from the impingement zone so that gas which flows downstream past one such duct can enter the next one.

Advantageously the gas inlet opening of the exhaust duct or of the first of them if there is more than one, is disposed at a distance from the substrate face being coated, measured normally to such face, of from 1 to 20 cm.

The invention can be applied for coating a continuous ribbon of float glass as it is formed. Thus, the invention includes processes wherein each droplet stream impinges on the top face of a ribbon of glass formed in a float tank at a position or positions downstream from the float tank where the temperature of the glass is within the range 100° to 650° C.

The process according to the invention can be applied for forming various oxide coatings by employing a liquid composition containing a metal salt. By reason of the way in which gases are drawn away from the coating zone the invention is suitable even for forming coatings starting with solutions which give off reactive vapors, e.g. solutions of metal chlorides. By way of example, a tin oxide coating can be formed by projecting droplets of a medium containing stannic chloride and a doping agent, e.g. a substance providing ions of antimony, arsenic or fluorene. The metal salt can be employed together with a reducing agent, e.g. phenyl hydrazine, formaldehyde, alcohols and noncarbonaceous reducing agents such as hydroxylamine, and hydrogen. Other tin salts may be used in place of or in addition to stannic chloride, e.g., stannous oxalate or stannous bromide. Examples of other metal oxide coatings which can be formed in a similar manner include oxides of cadmium, magnesium and tungsten. For forming such coatings, the coating composition can likewise be prepared by forming an aqueous or organic solvent solution of a compound of the metal and a reducing agent. As a further example, the invention can be employed for forming coatings by pyrolysis of organometallic compounds, e.g. a metal acetylacetonate, supplied in droplet form to the substrate face to be coated. It is within the scope of the invention to apply a composition coating salts of different metals so as to form a metal coating containing a mixture of oxides of different metals.

The invention includes apparatus suitable for use in forming a metal or metal compound coating on a face of a glass substrate by a process according to the invention as hereinbefore defined. Apparatus according to the present invention comprises means for supporting a substrate, means for heating the substrate and means for discharging droplets onto the substrate face to be coated, constructed and arranged to discharge at least one stream of droplets in a direction which is inclined to a supported substrate so as to impinge on a zone within the substrate face to be coated, and means for bringing about relative displacement of the droplet discharge means and the substrate to cause the instantaneous zone of impingement of the droplet stream on the face to be progressively displaced along such face area to be coated. The apparatus also includes gas exhaust means including an exhaust ducting whose entrance is located directly downstream from the impingement zone, the exhaust means being adapted continuously to suck gases environmental to the stream in the downstream direction away from the stream and from the vicinity of the impingement zone and directly into the ducting substantially without affecting the paths of the droplets toward the zone.

Apparatus according to the invention may include any additional feature or features which may be required for making use of any one or more of the various optional process features hereinbefore described.

Particular preference is given to apparatus constructed for supporting a continuously longitudinally moving glass ribbon in a given direction with the droplet discharge means arranged to discharge at least one stream of droplets in a direction such that it has a velocity component in that given direction and such that the included angle between the axis of such stream and the exposed face of the ribbon, measured in a plane which contains the axis and is parallel with the direction of the ribbon displacement, is in the range 25°–35°. Preferably, the droplet discharge means is constructed and arranged to discharge at least one droplet stream which is a parallel stream or is one which diverges from its source at an angle of not more than 30°, as hereinbefore referred to.

In certain apparatus according to the invention, adapted to apply the process for coating a continuously longitudinally moving glass ribbon, the droplet discharging means includes a droplet discharge head connected to means for displacing such head to and fro in a transverse direction across the ribbon path. Such apparatus includes embodiments in which the gas exhaust means includes an exhaust duct connected to means for displacing it to and fro across the ribbon path to maintain the entrance of such duct directly downstream of the zone of impingement of the droplet stream on the substrate.

In other forms of apparatus according to the invention for use in coating a continuously longitudinally moving glass ribbon, the droplet discharge means includes one or more droplet discharge heads for discharging one or more droplet streams whose impingement zone or combined impingement zones on the substrate extend across the whole or the greater part of the width of the ribbon path.

As an alternative to employing a displaceable gas exhaust means as above referred to, use is made in certain apparatus according to the invention of stationary exhaust ducting having an exhaust gas inlet which extends in a transverse direction across the ribbon path. Advantageously, such ducting has a series of exhaust inlets leading from side-by-side positions across the ribbon path.

In a particular embodiment, use is made of an exhaust duct extending transversely across the path along which gases are drawn from the impingement zone of the droplet stream and such duct has main gas inlet openings facing such zone and secondary gas entry openings located behind such main inlet openings.

It is advantageous to provide exhaust ducts at different spaced positions downstream from the aforesaid impingement zone so that gases which flow downstream past one exhaust duct can be drawn off by the next one. Preferably the exhaust gas inlet of the exhaust duct or the first of such ducts if there is more than one, is at a distance from 1 to 20 cm from the substrate face to be coated, measured normally to such face.

Very good results have been achieved when gases in the vicinity of the droplet stream and the impingement zone thereof on the substrate are exposed to suction forces causing them to flow along a path diverging from the substrate. Accordingly, in certain apparatus according to the invention the gas exhaust means includes exhaust ducting disposed so that in operation gases flow toward the entrance of the ducting along a path which diverges from the substrate.

The invention includes apparatus as above defined, installed in association with a float tank for forming a ribbon of glass by the float process, the droplet discharge means being arranged so that each stream of droplets impinges on the top face of the ribbon at a zone where the temperature of the glass is within the range 100° to 650° C.

An embodiment of the invention, selected by way of example, is illustrated in the FIGURE which is a diagrammatic side view partly in vertical section of part of a flat glass manufacturing plant incorporating coating apparatus according to the invention.

The coating apparatus is located in an annealing chamber 1, having a roof wall 2 and a sole wall 3, through which chamber the glass ribbon 4 is conveyed from a ribbon forming section of the plant. The chamber 1 may, for example, be part of the annealing lehr of a Libbey-Owens type sheet glass drawing machine, or it may be associated with a float tank in which the glass ribbon is formed by the float process.

The glass ribbon 4 is supported by rollers 5 and travels through chamber 1 in the direction indicated by arrow 6. Above the path of the glass ribbon the chamber 1 is provided with displaceable refractory screens 7 and 8 which define between them a compartment in which the metal or metal compound coating is formed on the upper face of the glass ribbon as it travels through the chamber.

A spray gun 9 is mounted above the horizontal path of the glass ribbon and is connected to mechanism (not shown ) for displacing such gun to and fro along a horizontal path normal to the direction of the ribbon displacement. The vertical distance between the spray gun and the top face of the glass ribbon is from 15 to 35 cm. The spray gun is orientated so that droplets are discharged in a conical spray whose mean angle α of inclination to the ribbon is from 25° to 35°, the cone angle being 20°.

At a distance of the order of 10 to 30 cm downstream from the downstream boundary 10 of the zone of impingement of the droplet stream on the glass ribbon, there is an exhaust duct 11 which is connected to means (not shown) for maintaining suction forces in the duct. The duct extends transversely across the ribbon path and has a nozzle 12 defining a slot-like gas inlet passage. The entry orifice of the nozzle is at a height of from 1 to 20 cm above the glass ribbon.

In this particular embodiment, a second exhaust duct 13 is provided which is spaced downstream from the duct 11.

When the apparatus is used, the discharge from the spray gun and the suction forces which serve to aspirate gases into the exhaust ducts 11 and 13 are adjusted so that in the zone upstream of the spray cone the atmosphere is substantially quiescent and unpolluted by vapor droplets or vapors of the sprayed substance, and so that the paths of the droplets from the spray gun to the glass ribbon are substantially unaffected by the suction forces. Moreover, the atmosphere above the zone of impingement of the droplets on the ribbon remains clear. The spray gun is continuously moved to and fro transversely across the ribbon path and the continuously exerted suction forces are such that the atmosphere above any coated zone across the ribbon becomes completely cleared in the period of time taken for the spray gun to complete one movement cycle comprising a to and fro movement across the ribbon path.

By way of modification, the spray gun 9 could be replaced by a series of stationary spray guns mounted in side-by-side positions across the ribbon path so that they together apply coating substance over the full width of the ribbon path, or by a stationary atomizer having a droplet discharge head extending across such path.

The following are examples of processes according to the invention performed with the aid of apparatus as above described.

EXAMPLE 1

Coating apparatus as described with reference to the accompanying drawing was employed for coating a ribbon of glass 3 meters in width in course of its production by a Libbey-Owens type drawing process, the speed of the glass ribbon being of the order of 1 meter per minute. The coating apparatus was installed at a position such that the temperature of the glass at a zone of impingement of the droplet stream was of the order of 600° C.

The spray gun was of a conventional type, and was operated at a pressure of the order of 4 kg/cm$^2$. The gun was displaced to and fro across the ribbon path at a height of 30 cm above the glass ribbon, so as to complete nine reciprocations per minute. The spray gun was directed so that the axis of the spray was at 30° to the plane of the glass ribbon.

The suction forces in the exhaust ducting were adjusted to maintain a depression of the order of 100 mm of water in the suction nozzle of each of the ducts 11 and 13, which nozzles were 20 cm above the glass ribbon.

The spray gun was fed with an aqueous solution of tin chloride obtained by dissolving in water 375 g per liter of hydrated tin chloride ($SnCl_2 \cdot 2H_2O$), and adding 55 g per liter of $NH_4HF_2$.

The rate of delivery of the coating solution was 20 liters per hour, in an amount of 10 Nm$^3$/hr of carrier gas. A coating of tin oxide doped by fluorine ions and having a thickness of 7,500 Å, was formed on the glass ribbon.

Examination of the coating showed it to be of uniform thickness and optical properties and to have a homogeneous structure. The coating had a neutral tint viewed by reflected light. The coating possessed a high visible light transmissivity and possessed an appreciable reflective power in respect of infrared rays in the wavelength range 2.6 to 40 microns. The emissivity of the coating was 0.1. The diffuse luminous transmission of the coating was very small.

Similar results were obtained in a process in which the same coating procedure was followed for coating a ribbon of float glass as it traveled from the float tank.

EXAMPLE 2

A ribbon of glass was coated by a process similar to that of Example 1, the difference being that the spray gun was reciprocated at 6 cycles per minute and was fed with 15 N- cubic meters per hour of air and 30 liters per hour of an aqueous solution comprising per liter of water 325 g of anhydrous $SnCl_2$ and 60 g of $NH_4HF_2$. A coating composed of tin oxide doped by fluorine ions, and having a thickness of 10,000 Å was formed on the glass. The coating had a very uniform thickness and uniform optical properties, and had a homogeneous structure. The coating had a grey tint viewed by reflected light. Visible light transmission through the coated glass was slightly lower than through the glass coated according to Example 1 but the coating also had a high reflective power in respect of radiation in the far infrared spectral region. Like the coating formed according to Example 1, the coating exhibited only a very slight diffuse light transmission.

EXAMPLE 3

Apparatus as used in Example 1 was employed for coating a ribbon of glass having at the impingement zone of the droplets a temperature of the order of 580° C. The spray gun was supplied with a solution of the reaction product of anhydrous $SnCl_4$ with methanol. The concentration of the solution was adjusted by means of dimethylformamide after addition of HCl for stabilizing the solution, and $NH_4HF_2$ as doping agent. The composition of the solution was as follows: 200 cc $SnCl_4$ (anhydrous), 625 cc methanol, 50 cc HCl, 62 g $NH_4HF_2$ and dimethylformamide to make 1 liter of solution. The rates of supply of this solution and of the air to the spray gun were of the same order as the supply rates in Example 1.

The suction forces were adjusted to maintain a depression of the order of 100 mm of water in the suction nozzles of the exhaust ducts 11 and 13. The delivery of the coating solution was regulated so that a coating of $SnO_2$ doped by fluorine ions and having a thickness of 7,200 Å was formed on the glass ribbon.

Examination of the coating showed it to possess a homogenous structure. The coating was uniform in thickness and in respect of its optical properties. The coating had a neutral tint in reflection. The coating had a high visible light transmissivity and a particularly high reflecting power in respect of radiation in the far infrared region of the spectrum. The coating exhibited very slight diffuse light transmission.

In a modification of the foregoing process, in which substantially identical results were obtained, the above coating solution was substituted by a solution obtained by reacting $SnCl_4$ with acetic anhydride in stoichiometric proportions, slowly agitating the resulting very syrupy brown-black liquid to allow escape of HCl, diluting the mixture with dimethylformamide and adding some cubic centimeters of a 40% by volume commercial solution of HF as doping agent.

EXAMPLE 4

A ribbon of float glass having a width of about 2.5 meters was coated as it traveled from the float tank, at a speed of 4.5 meters per minute, using a coating apparatus as represented in the drawing.

The spray gun was of conventional type and was operated under a pressure of the order of 3 kg/cm². The gun was mounted 25 cm above the glass ribbon and was pointed at an inclination of 30° to the ribbon plane. The gun was reciprocated at 10 cycles per minute. The gun was fed at a rate of the order of 50 liters per hour with a solution obtained by dissolving in dimethylformamide, per liter, 140 g of cobalt acetylacetonate $Co(C_5H_7O_2)2H_2O$. The gun was located so that this solution impinged on the glass ribbon at a position along its path where the glass had a temperature of the order of 580° C.

The suction nozzle 12 of the exhaust duct 11 was located 20 cm above the glass ribbon. The suction forces were adjusted so that a depression of the order of 50 mm of water was maintained in the suction nozzles. The exhaust duct 13 was not employed.

The rate of discharge of the coating solution was adjusted so that a coating of cobalt oxide $(Co_3O_4)$ having a thickness of the order of 920 Å formed on the glass.

The coating was examined and was found to possess a homogenous structure. The coating was perfertly uniform in thickness. The coating had a brown tint viewed by transmitted light. The optical properties of the coated glass were uniform and of good quality over the whole of the coated area.

The foregoing coating procedure can be followed for forming colored layers composed of a mixture of oxides by feeding the spray gun with a solution containing a mixture of compounds of different metals e.g. compounds of metals selected from the group iron, cobalt, chromium and nickel, or by making use of a plurality of spray guns and feeding different solutions simultaneously through different guns.

EXAMPLE 5

A glass ribbon approximately 3 meters in width, being formed by the Libbey-Owens process and moving at a speed of 1.5 meters per minute was coated by making use of coating apparatus as described with reference to the accompanying drawing, the coating apparatus being disposed so that the coating solution contacted the glass where its temperature was of the order of 580° C.

The spray gun was reciprocated at 10 cycles per minute and was operated under a pressure of 1.5 kg/cm² to deliver 15 liters per hour of coating solution. The gun was mounted 25 cm above the glass ribbon and was directed at an inclination of 25° to the ribbon plane.

The coating solution used was a solution of titanyl acetylacetonate in dimethylformamide in a concentration of 130 g per liter.

The suction nozzle 12 of the exhaust duct 11 was 10 cm above the glass ribbon. The suction forces were adjusted to maintain a depression of some dozens of mm of water in such suction nozzle. The duct 13 was not used.

The discharge from the spray gun was adjusted so as to form on the glass a coating of $TiO_2$ 450 Å in thickness.

Examination of the coated glass showed that its overall light transmission was of the order of 65%. The coating had a homogeneous structure and was uniform in respect of its thickness and optical properties. The diffuse light transmission of the coated glass was almost nil. The coating appeared grey by transmitted light.

In a modification of the foregoing process the coating solution was replaced by an aqueous solution of $TiCl_4$ and the spray gun and the suction forces were adjusted so that a coating of $TiO_2$ having a thickness of 800 Å was formed on the glass. The optical qualities of the coating were equivalent to those of the coating formed in the above example.

EXAMPLE 6

A coating was formed on a glass ribbon by means of a coating apparatus as used in Example 1, the coating apparatus being arranged so that the sprayed droplets of coating solution contacted the glass where its temperature was 585° C.

The coating solution, which was supplied at a rate of the same order as that used in Example 1, was obtained by dissolving 595 g of $SnCl_4.5H_2O$ and 3 g of $SbCl_3$ per liter of solvent, the solvent being a mixture of water and dimethylformamide containing a little hydrochloric acid.

The location and displacement of the spray gun were as in Example 1. The suction forces were adjusted to maintain a depression of the order of 100 mm of water in the suction nozzles of the ducts 11 and 13. The discharge from the spray gun was adjusted so that a coating of $SnO_2$ doped by antimony ions and having a thickness of 8,000 Å formed on the glass.

The coating was of neutral tint in reflection. The coating possessed a homogeneous structure and its thickness and optical properties were uniform over the area of the coating. The diffuse light transmission of the coated glass was very slight. The coating had a very high reflective power in respect of radiation in the far infrared wavelength band.

What is claimed is:

1. A process of forming a uniform metal or metal compound coating on a face of a glass substrate by contacting such face while at elevated temperature with droplets comprising a metal compound which by pyrolysis forms the coating metal or metal compound on said face, the improvement which comprises the steps of discharging at least one stream of said droplets at an inclination to said face so as to impinge on a zone within the face area to be coated, effecting a relative displacement between said stream and substrate in a given direction so that the instantaneous zone of impingement of said stream on said face is progressively displaced along said face area to be coated, said steam being inclined so that it has a velocity component in said given direction and creating suction forces in exhaust ducting whose entrance is located directly downstream from said impingement zone so as to cause gases environmental to said stream to flow continuously in the downstream direction away from said steam and from the vicinity of said impingement zone and directly into said ducting substantially without affecting the paths of the droplets toward said zone.

2. A process as defined in claim 1, wherein the substrate is disposed in said given direction to accomplish said relative displacement and the stream is inclined so that the included angle between its axis and said face measured in a plane which contains said axis and is parallel with the direction of displacement of the substrate is in the range 25°–35°.

3. A process as defined in claim 2, wherein said stream is one which diverges from its source at an angle of not more than 30°.

4. A process as defined in claim 1, wherein the distance between the position from which said droplet stream is discharged and said face, measured normally to such face, is from 15 to 35 cm.

5. A process as defined in claim 1, wherein the substrate is a ribbon of glass which is in movement parallel with its longitudinal axis and the process in performed for coating a face of such ribbon by using a stream which is displaced to and fro transversely of the ribbon path.

6. A process as defined in claim 5, wherein said suction forces are created in an exhaust duct which is displaced to and fro across the ribbon path so that the entrance of said duct remains directly downstream from said impingement zone.

7. A process as defined in claim 1, wherein the substrate is a ribbon of glass which is in movement parallel with its longitudinal axis and the process is performed for coating a face of the ribbon by using at least one stream whose impingement zone on the substrate extends across the greater part of the width of the ribbon.

8. A process as defined in claim 7, wherein said substrate is a continuously longitudinally moving ribbon of glass and use is made of stationary exhaust ducting having an exhaust gas inlet which extends transversely across the ribbon path.

9. A process as defined in claim 8, wherein said exhaust ducting has a series of exhaust inlets leading from side-by-side positions across the ribbon path.

10. A process as defined in claim 8, wherein said suction forces are created in exhaust ducting which has main gas entry openings facing generally toward the impingement zone of the droplet stream on the substrate face, and further gas entry openings, located at positions behind such main openings, for the entry of gas which flows past such main openings.

11. A process as defined in claim 1, wherein gases are sucked into a plurality of exhaust ducts disposed at successive spaced positions downstream from the impingement zone so that gas which flows downstream past one such duct can enter the next one.

12. A process as defined in claim 1, wherein said substrate is a ribbon of glass formed in a float tank and each stream impinges on the top face of the ribbon downstream from the tank and where the temperature of the glass is within the range 100° to 650° C.

13. Apparatus suitable for use in forming a uniform metal or metal compound coating on a face of a glass substrate by contacting such face while it is at elevated temperature with droplets comprising a metal compound which by pyrolysis forms said coating metal or metal compound on said face, such apparatus comprising:

means for supporting said substrate;
means for heating such substrate;
means for discharging at least one stream of droplets in a direction which is inclined to a supported substrate so as to impinge on a zone within the substrate face area to be coated;
means for bringing about relative displacement of said droplet discharge means and said substrate in a given direction to cause the instantaneous zone of impingement of the said droplet stream on said face to be progressively displaced along such face area to be coated, the inclination of the stream discharging from said stream discharging means being such as to have a velocity component in said given direction; and
gas exhaust means including exhaust ducting whose entrance is located directly downstream from said impingement zone, said exhaust means being adapted continuously to suck gases environmental to said stream in the downstream direction away from said stream and from the vicinity of said impingement zone annd directly into said ducting substantially without affecting the paths of the droplets toward said zone.

14. Apparatus as defined in claim 13, wherein said relative displacement means includes means for displacing the supported substrate in a given direction, said droplet discharge means being constructed and arranged to discharge at least one stream of droplets in a direction such that it has a velocity component in said given direction and the included angle between the axis of said stream and the exposed face of a flat supported and moving substrate, measured in a plane which contains said axis and is parallel with said given direction is in the range 25°–35°.

15. Apparatus as defined in claim 13, wherein said droplet discharge means is constructed and arranged to discharge at least one droplet stream which diverges from its source at an angle of not more than 30°.

16. Apparatus as defined in claim 13, wherein said droplet discharge means is located so that the distance between the position from which each droplet stream is discharged and the exposed face of a flat substrate when that is in position on said substrate supporting means, measured normally to said face, is in the range 15 to 35cm.

17. Apparatus as defined in claim 13, wherein said substrate supporting means is adapted to support a continuously longitudinally moving glass ribbon and said droplet discharging means includes a droplet discharge head connected to means for displacing such head to and fro in a transverse direction across the ribbon path.

18. Apparatus as defined in claim 17, wherein said gas exhaust means includes an exhaust duct connected to means for displacing it to and fro across the ribbon path to maintain the entrance of such duct directly downstream of the zone of impingement of said droplet stream on the substrate.

19. Apparatus as defined in claim 13, wherein said substrate supporting means is adapted to support a continuously longitudinally moving glass ribbon and said droplet discharge means includes at least one droplet discharge head for discharging a droplet stream whose impingement zone on the substrate extends across the greater part of the width of the ribbon path.

20. Apparatus as defined in claim 17, wherein said substrate supporting means is adapted to support a continuously longitudinally moving glass ribbon and said exhaust means includes stationary exhaust ducting having an exhaust gas inlet which extends in a transverse direction across the ribbon path.

21. Apparatus as defined in claim 20, wherein said ducting has a series of exhaust inlets leading from side-by-side positions across the ribbon path.

22. Apparatus as defined in claim 20, wherein said exhaust ducting extends transversely across the path of the exhaust gases, said ducting having main gas inlet openings facing said impingement zone and secondary gas entry openings located behind said main inlet openings.

23. Apparatus as defined in claim 13, wherein said ducting includes exhaust ducts at different spaced positions downstream from the impingement zone so that gases which flow downstream past one exhaust duct can be drawn off by the next one.

24. Apparatus as defined in claim 13, wherein said gas exhaust means includes exhaust ducting disposed so that in operation gases flow toward the entrance of said ducting along a path which diverges from the substrate.

25. Apparatus defined in claim 13, wherein said droplet discharge means is arranged downstream of the exit end of a float tank for forming a ribbon of glass by the float process and so that each stream of droplets impinges on the top face of the ribbon at a zone where the temperature of the glass is within the range 100° to 650° C.

* * * * *